(12) United States Patent
Yan et al.

(10) Patent No.: US 9,715,089 B1
(45) Date of Patent: Jul. 25, 2017

(54) CAMERA LENS

(71) Applicants: Junjie Yan, Shenzhen (CN); Jianming Wang, Shenzhen (CN); Hiroyuki Teraoka, Shenzhen (CN)

(72) Inventors: Junjie Yan, Shenzhen (CN); Jianming Wang, Shenzhen (CN); Hiroyuki Teraoka, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/257,370

(22) Filed: Sep. 6, 2016

(30) Foreign Application Priority Data

Apr. 30, 2016 (CN) .......................... 2016 1 0279378

(51) Int. Cl.
  *G02B 13/00* (2006.01)
  *G02B 9/60* (2006.01)
  *G02B 27/00* (2006.01)

(52) U.S. Cl.
  CPC ........... *G02B 13/0045* (2013.01); *G02B 9/60* (2013.01); *G02B 27/0025* (2013.01)

(58) Field of Classification Search
  CPC ....... G02B 13/0045; G02B 9/60; G02B 13/04
  USPC ................................ 359/714, 753, 763, 764
  See application file for complete search history.

(56) References Cited

U.S. PATENT DOCUMENTS

2016/0109686 A1* 4/2016 Lin .................... G02B 13/0045
  348/373

FOREIGN PATENT DOCUMENTS

JP        5513641        6/2014
JP        2015-225246    12/2015

* cited by examiner

*Primary Examiner* — William Choi
(74) *Attorney, Agent, or Firm* — Na Xu; IPro, PLLC (57) ABSTRACT

A camera lens is disclosed. The camera lens includes five piece ultra-thin and wide angle lenses with excellent optical properties and with chromatic aberration sufficiently corrected as follows: a first lens with positive refractive power; a second lens with negative refractive power; a third lens with negative refractive power; a fourth lens with positive refractive power; a fifth lens with negative refractive power which are arranged sequentially from an object side to an image side. The camera lens is characterized in that it meets specified conditions.

2 Claims, 5 Drawing Sheets

CAMERA LENS

FIELD OF THE INVENTION

The present invention relates to a camera lens, and more particularly to a camera lens very suitable for mobile phone camera module and WEB camera lens etc. equipped with high-pixel camera elements such as CCD, CMOS etc.

DESCRIPTION OF RELATED ART

In recent years, various camera devices equipped with camera elements such as CCD, CMOS are extensively popular. Along with development on camera lens toward miniaturization and high performance, ultra-thin and high-luminous flux (Fno) wide angle camera lenses with excellent optical properties are needed.

The technology related to the camera lens comprises five piece ultra-thin and wide angle lenses with excellent optical properties and with chromatic aberration sufficiently corrected is developed gradually. The camera lens mentioned in the proposal of prior reference documents 1, 2 is composed of five piece lenses which are arranged sequentially from object side as follows: a first lens with positive refractive power; a second lens with negative refractive power; a third lens with positive refractive power; a fourth lens with positive refractive power and a fifth lens with negative refractive power.

The camera lens disclosed in embodiment 1~5 of the prior reference document 1 is composed of above mentioned 5 piece lenses, but shape of the first lens and the second lens is improper and ratio of center thickness of the fourth lens to overall focal distance of the camera lens is insufficient; so TTL/LH≥1.58 it is not sufficiently ultra-thin.

The camera lens disclosed in embodiment 1~6 of the prior reference document 2 is composed of above mentioned 5 piece lenses, but shape of the second lens and refractive power distribution of the second lens is improper and ratio of center thickness of the fourth lens to overall focal distance of the camera lens is insufficient; so it is not sufficiently ultra-thin.

PRIOR REFERENCE DOCUMENTS

[Prior Reference Document 1] Japan Patent No. JP5513641;
[Prior Reference Document 2] Japan Patent Publication No. JP2015-225246.

Therefore, it is necessary to provide a novel camera lens to solve the above-mentioned technical problem.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of present disclosure more apparent, the present disclosure is described in further detail together with the figures and the embodiments. It should be understood the specific embodiments described hereby is only to explain this disclosure, not intended to limit this disclosure.

Figure 1:
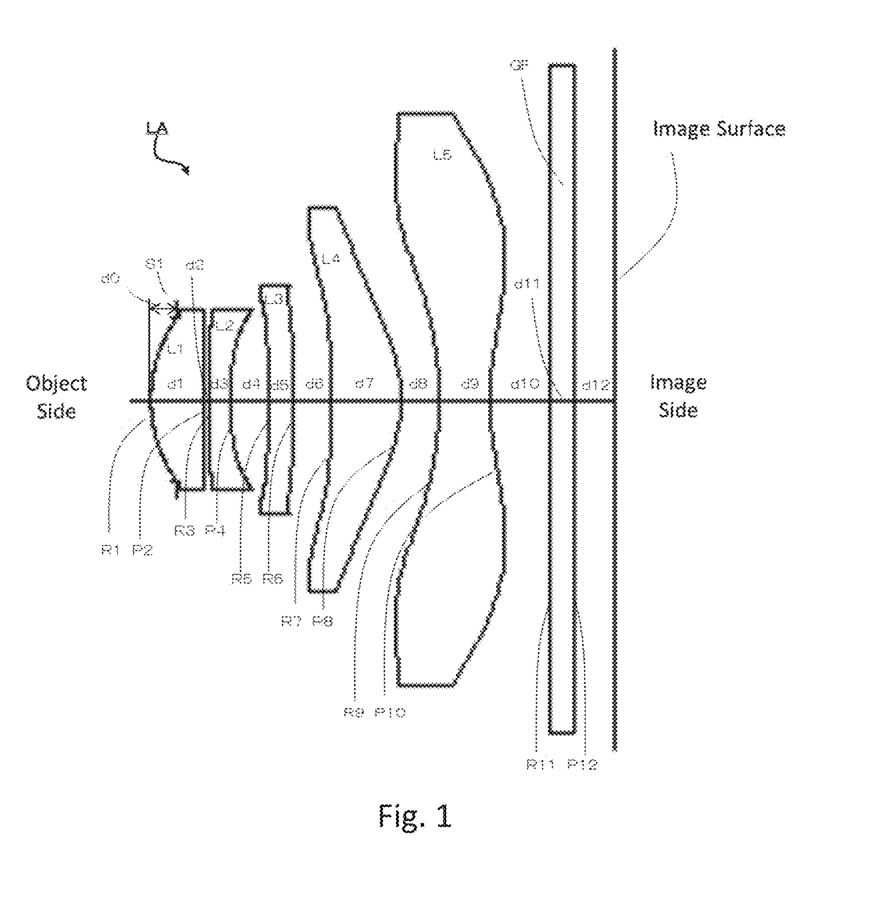
FIG. 1 is an illustrative structure of a camera lens LA of the present disclosure.

A camera lens LA in accordance with an embodiment of the present disclosure includes, in an order from an object side to an image side, a first lens L1, a second lens L2, a third lens L3, a fourth lens L4, and a fifth lens L5. A glass plate GF is arranged between the fifth lens L5 and the imaging surface. And a glass cover or an optical filter having the function of filtering IR can serve as the glass plate GF. Moreover, it shall be OK if no glass plate GF is arranged between the fifth lens L5 and the imaging surface.

The first lens L1 has positive refractive power; the second lens L2 has negative refractive power; the third lens L3 has positive or negative refractive power; the fourth lens L4 has positive refractive power; the fifth lens has negative refractive power. Moreover, the surfaces of the five lenses should be designed as the aspheric shape preferably in order to correct the aberration well.

The camera lens LA satisfies the following conditions (1)~(6):

$$0.70 \leq f1/f \leq 0.80 \tag{1};$$

$$-2.00 \leq f2/f \leq -1.15 \tag{2};$$

$$0.63 \leq f4/f \leq 0.80 \tag{3};$$

$$-2.00 \leq (R1+R2)/(R1-R2) \leq -1.25 \tag{4};$$

$$1.30 \leq (R3+R4)/(R3-R4) \leq 2.50 \tag{5};$$

$$0.10 \leq d7/f \leq 0.19 \tag{6}; \text{ where,}$$

f: overall focal distance of the camera lens
f1: focal distance of the first lens L1.
f2: focal distance of the second lens L2
f4: focal distance of the fourth lens L4
R1: the curvature radius of the first lens L1's object side surface
R2: the curvature radius of the first lens L1's image side surface
R3: curvature radius of the second lens L2's object side surface
R4: curvature radius of the second lens L2's image side surface
d7: center thickness of the fourth lens L4

The positive refractive power of the first lens L1 is specified in the condition (1). It is difficult for development of wide angle trend when the numerical range exceeds the lower limit specified in the condition (1); however, the aberration cannot be corrected easily because the positive refractive power of the first lens L1 becomes too strong; on the contrary, when the numerical range exceeds the upper limit specified, the development of ultra-thin trend cannot be implemented easily because the refractive power of the first lens L1 becomes too weak.

Therefore, numerical range of condition (1) should be set within the numerical range of the following condition (1-A) preferably, $$0.72 \leq f1/f \leq 0.78 \qquad (1\text{-}A)$$

Negative refractive power of the second lens L2 is specified in the condition (2). Moreover, the problems, such as correction of chromatic aberration on axle and outside of axle cannot be implemented easily along development of ultra-thin and wide angle trend outside the range of the condition (2).

Therefore, numerical range of condition (2) should be set within the numerical range of the following condition (2-A) preferably, $$-1.90 \leq f2/f \leq -1.40 \qquad (2\text{-}A)$$

The positive refractive power of the fourth lens L4 is specified in the condition (3). In the status that chromatic aberration on axle and outside of axle is sufficiently corrected, the development of wide angle and ultra-thin trend is more effective through meeting the condition (3).

Therefore, numerical range of condition (3) should be set within the numerical range of the following condition (3-A) preferably, $$0.65 \leq f4/f \leq 0.75 \qquad (3\text{-}A)$$

The shape of the first lens L1 is specified in the condition (4). Moreover, the problems, such as correction of high order aberration such as aberration of spherical surface cannot be implemented easily along development of ultra-thin and wide angle trend outside the range of the condition (4).

Therefore, numerical range of condition (4) should be set within the numerical range of the following condition (4-A) preferably, $$-1.65 \leq (R1+R2)/(R1-R2) \leq -1.30 \qquad (4\text{-}A)$$

Shape of the second lens L2 is specified in the condition (5). Moreover, the problems, such as correction of chromatic aberration on axle cannot be implemented easily along development of ultra-thin and wide angle trend outside the range of the condition (5).

Therefore, numerical range of condition (5) should be set within the numerical range of the following condition (5-A) preferably, $$1.60 \leq (R3+R4)/(R3-R4) \leq 2.00 \qquad (5\text{-}A)$$

Ratio of center thickness of the fourth lens L4 to overall focal distance of the camera lens is specified in condition (6). Moreover, the development of ultra-thin and wide angle trend cannot be implemented easily outside the range of the condition (6).

The third lens L3 has positive or negative refractive power and meets the following condition (7).

$$10.00 \leq |f3|/f \qquad (7); \text{where,}$$

f: overall focal distance of the camera lens
f3: focal distance of the third lens L3.

The positive or negative refractive power of the third lens L3 is specified in the condition (7). Moreover, correction of chromatic aberration on axle and outside of axle cannot be implemented easily along development of ultra-thin trend outside the range of the condition (7)

Therefore, numerical range of condition (7) should be set within the numerical range of the following condition (7-A) preferably, $$11.50 \leq |f3|/f \leq 85.00 \qquad (7\text{-}A)$$

Because five lenses of camera Lens all have the stated formation and meet all the conditions, so it is possible to produce a camera lens which is composed of five ultra-thin, wide angle lenses with excellent optional properties and with chromatic aberration sufficiently corrected.

The camera lens LA of the invention shall be explained below by using the embodiments. Moreover, the symbols used in all embodiments are shown as follows. And mm shall be taken as the units of the distance, the radius and the center thickness.

f: overall focal distance of the camera lens LA
f1: focal distance of the first lens L1
f2: focal distance of the second lens L2
f3: focal distance of the third lens L3
f4: focal distance of the fourth lens L4
f5: focal distance of the fifth lens L5
Fno: F value
2ω: total angle of view
S1: aperture
R: curvature radius of optical surface, central curvature radius when the lens is involved
R1: curvature radius of the first lens L1's object side surface
R2: curvature radius of the first lens L1's image side surface
R3: curvature radius of the second lens L2's object side surface
R4: curvature radius of the second lens L2's image side surface
R5: curvature radius of the third lens L3's object side surface
R6: curvature radius of the third lens L3's image side surface
R7: curvature radius of the fourth lens L4's object side surface
R8: curvature radius of the fourth lens L4's image side surface
R9: curvature radius of the fifth lens L5's object side surface
R10: curvature radius of the fifth lens L5's image side surface
R11: curvature radius of the glass plate GF's object side surface
R12: curvature radius of the glass plate GF's image side surface
d: center thickness of lenses or the distance between lenses
d0: axial distance from the open aperture S1 to the object side surface of the first lens L1
d1: center thickness of the first lens L1
d2: axial distance from the image side surface of the first lens L1 to the object side surface of the second lens L2
d3: center thickness of the second lens L2
d4: axial distance from the image side surface of the second lens L2 to the object side surface of the third lens L3
d5: center thickness of the third lens L3 d6: axial distance from the image side surface of the third lens L3 to the object side surface of the fourth lens L4 d7: center thickness of the fourth lens L4 d8: axial distance from the image side surface of the fourth lens L4 to the object side surface of the fifth lens L5 d9: center thickness of the fifth lens L5 d10: axial distance from the image side surface of the fifth lens L5 to the object side surface of the glass plate GF d11: center thickness of the glass plate GF d12: axial distance from the image side surface to the imaging surface of the glass plate GF nd: refractive power of line d nd1: refractive power of line d of the first lens L1 nd2: refractive power of line d of the second lens L2 nd3: refractive power of line d of the third lens L3 nd4: refractive power of line d of the fourth lens L4 nd5: refractive power of line d of the fifth lens L5 nd6: refractive power of line d of the glass plate GF

νd: abbe number

ν1: abbe number of the first lens L1

ν2: abbe number of the second lens L2

ν3: abbe number of the third lens L3

ν4: abbe number of the fourth lens L4

ν5: abbe number of the fifth lens L5

ν6: abbe number of the glass plate GF

Embodiment 1 are shown in the Table 1, wherein the camera lens LA is formed by the lens L1-L5; and the data including conic coefficients k and aspheric coefficients are shown in the Table 2.

TABLE 1

|  | R | d |  | nd |  | ν d |
|---|---|---|---|---|---|---|
| S1 | ∞ | d0 = −0.210 |  |  |  |  |
| R1 | 1.19808 | d1 = 0.446 | nd1 | 1.5441 | ν 1 | 56.12 |
| R2 | 8.09707 | d2 = 0.046 |  |  |  |  |
| R3 | 9.07203 | d3 = 0.177 | nd2 | 1.6422 | ν 2 | 22.41 |
| R4 | 2.32022 | d4 = 0.319 |  |  |  |  |
| R5 | 16.13640 | d5 = 0.211 | nd3 | 1.6422 | ν 3 | 22.41 |
| R6 | 21.01667 | d6 = 0.332 |  |  |  |  |
| R7 | −6.24665 | d7 = 0.589 | nd4 | 1.5441 | ν 4 | 56.12 |
| R8 | −1.13575 | d8 = 0.318 |  |  |  |  |
| R9 | −3.00531 | d9 = 0.426 | nd5 | 1.5352 | ν 5 | 56.12 |
| R10 | 1.97829 | d10 = 0.500 |  |  |  |  |
| R11 | ∞ | d11 = 0.210 | nd6 | 1.5168 | ν 6 | 64.17 |
| R12 | ∞ | d12 = 0.356 |  |  |  |  |

TABLE 2

| | conic coefficient | aspheric coefficient | | | | | | |
|---|---|---|---|---|---|---|---|---|
|  | k | A4 | A6 | A8 | A10 | A12 | A14 | A16 |
| R1 | −3.8718E−01 | 2.9120E−03 | 1.3673E−01 | −3.3084E−01 | 2.1785E−01 | 1.0533E−01 | −1.5672E−01 | −3.7211E−01 |
| R2 | −1.3253E+02 | −2.1511E−01 | 1.7083E−01 | 1.9333E+00 | −8.1065E+00 | 1.4007E+01 | −1.2665E+01 | 4.9094E+00 |
| R3 | −8.5605E+00 | −2.6594E−01 | 7.4533E−01 | 3.3977E−02 | −2.9393E+00 | 5.7394E+00 | −4.7323E+00 | 1.3004E+00 |
| R4 | 2.2416E+00 | −7.4337E−02 | 6.7377E−01 | −9.9153E−01 | 9.3384E−01 | 5.7847E−01 | −9.4446E−01 | −4.5184E−01 |
| R5 | 2.9514E+02 | −1.9854E−01 | −8.1150E−01 | 6.2360E−01 | −1.5132E+00 | 2.8674E+00 | −2.8341E+00 | 8.1835E−01 |
| R6 | −4.8736E+02 | −1.2232E−01 | −8.1103E−02 | 2.3624E−01 | −2.7560E−01 | 4.8607E−01 | −4.2200E−01 | 1.3630E−01 |
| R7 | −5.7846E+00 | 3.4202E−02 | −1.1497E−01 | 8.1299E−02 | −3.2735E−02 | 1.6914E−02 | −6.4765E−03 | 9.5917E−04 |
| R8 | −3.8965E+00 | −7.7646E−03 | 6.9752E−02 | −1.6028E−01 | 1.9136E−01 | −1.1100E−01 | 3.0293E−02 | −3.1307E−03 |
| R9 | −1.9071E+01 | −1.9650E−02 | −8.0899E−02 | 8.6214E−02 | −3.5230E−02 | 7.2134E−03 | −7.3222E−04 | 2.9037E−05 |
| R10 | −1.2910E+01 | −5.0197E−02 | −2.7891E−03 | 1.1591E−02 | −6.2043E−03 | 1.5507E−03 | −1.8678E−04 | 8.7454E−06 |

TTL: optical length (axial distance from object side surface to the imaging surface of the first lens L1)

LB: axial distance (including thickness of the glass plate GF) from the image side surface to the imaging surface of the fifth lens L5;

IH: image height $$y=(x2/R)/[1+\{1-(k+1)(x2/R2)\}1/2]+A4 \times 4+A6 \times 6+A8 \times 8+A10 \times 10+A12 \times 12+A14 \times 14+A16 \times 16$$ (8); where R indicates the curvature radius on the axle; k indicates the conic coefficient; and A4, A6, A8, A10, A12, A14 and A16 indicates the coefficients of the aspheric surface.

For convenience sake, the aspheric surface shown in the formula (8) shall be taken as the aspheric surfaces of all lens surfaces. However, the invention shall be not limited to the polynomial form of the aspheric surface shown in the formula (8).

Embodiment 1

Figure 2:
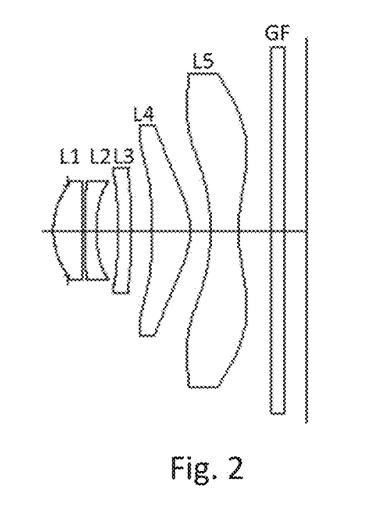
FIG. 2 is an illustrative structure of a camera lens LA in accordance with a first embodiment (Embodiment 1) of the present disclosure.

The configuration structure diagram of the camera lens LA in the Embodiment 1 is shown in the FIG. 2. Moreover, the data including curvature radius R of the object side surfaces and the image side surfaces, center thicknesses of the lenses, the distances d among the lenses, refractive powers nd and abbe numbers ν d of the lens L1-L5 in the The values in the embodiments 1 and 2 and the values corresponding to the parameters specified in the conditions (1)-(7) are shown in the subsequent Table 5.

The Embodiment 1 meets the conditions (1)-(7), as shown in Table 5.

Figure 3:
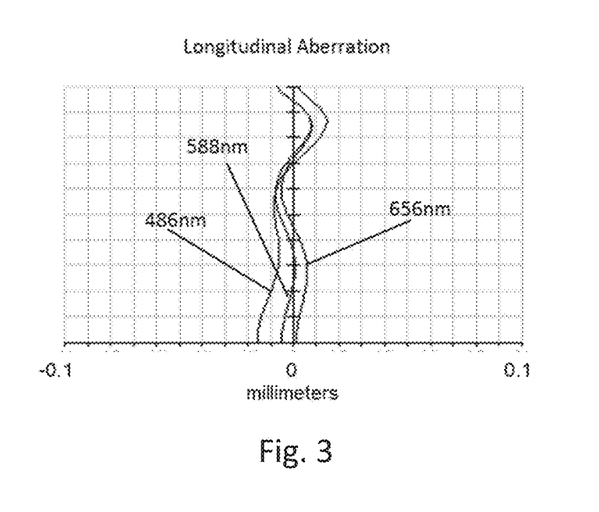
FIG. 3 is a Longitudinal Aberration diagram of the camera lens LA in the Embodiment 1.
Figure 4:
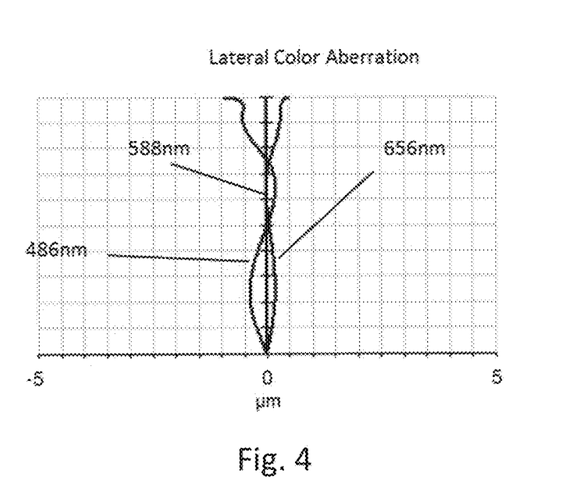
FIG. 4 is a Lateral Color Aberration diagram of the camera lens LA in the Embodiment 1.
Figure 5:
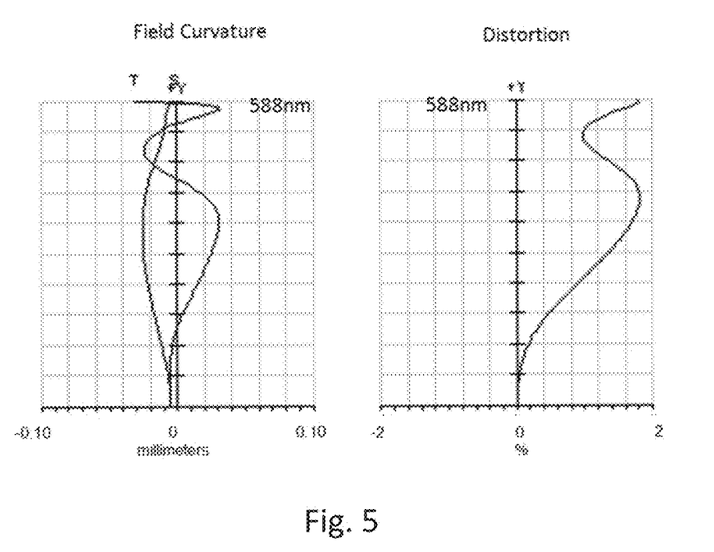
FIG. 5 is a Field Curvature Distortion of the camera lens LA in the Embodiment 1.

See FIG. 3 for Longitudinal Aberration of the camera lens LA in the Embodiment 1, see FIG. 4 for Lateral Color Aberration of it, and see FIG. 5 for curvature of field and distortion of it. Further, the curvature of field S in the FIG. 5 is the one in the sagittal direction, and T is the one in the direction of meridian, as well as in the Embodiment 2. As shown in FIGS. 3~5, the camera lens in embodiment 1 has 2ω=81.0°,TTL/IH=1.339 and is also wide angle and ultra-thin, it is no wonder why chromatic aberration on axle and outside of axle is sufficiently corrected and why it has excellent optical properties.

Embodiment 2

Figure 6:
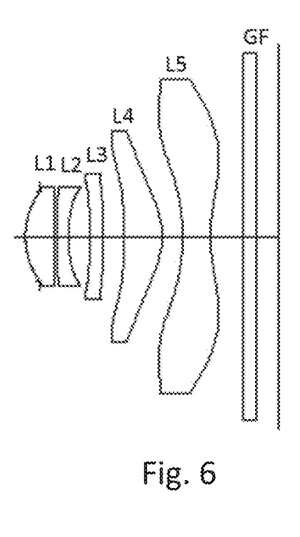
FIG. 6 is an illustrative structure of a camera lens LA in accordance with a second embodiment (Embodiment 2) of the present disclosure.

The configuration structure diagram of the camera lens LA in the Embodiment 2 is shown in FIG. 6. Moreover, the curvature radius R of the object side surfaces and the image side surfaces, the center thicknesses of the lenses, the distances d among the lenses, the refractive powers nd and abbe numbers νd of the lens L1-L5 in the Embodiment 2 are shown in the Table 3, wherein the camera lens LA is formed by the lens L1-L5; and the conic coefficients k and aspheric coefficients are shown in the Table 4.

TABLE 3

| | R | d | nd | | νd | |
|---|---|---|---|---|---|---|
| S1 | ∞ | d0 = −0.210 | | | | |
| R1 | 1.20122 | d1 = 0.431 | nd1 | 1.5441 | ν1 | 56.12 |
| R2 | 8.07855 | d2 = 0.048 | | | | |
| R3 | 9.35839 | d3 = 0.204 | nd2 | 1.6422 | ν2 | 22.41 |
| R4 | 2.35124 | d4 = 0.319 | | | | |
| R5 | 14.77093 | d5 = 0.208 | nd3 | 1.6422 | ν3 | 22.41 |
| R6 | 18.28615 | d6 = 0.330 | | | | |
| R7 | −6.72451 | d7 = 0.590 | nd4 | 1.5441 | ν4 | 56.12 |
| R8 | −1.14856 | d8 = 0.316 | | | | |
| R9 | −3.06619 | d9 = 0.420 | nd5 | 1.5352 | ν5 | 56.12 |
| R10 | 1.95761 | d10 = 0.500 | | | | |
| R11 | ∞ | d11 = 0.210 | nd6 | 1.5168 | ν6 | 64.17 |
| R12 | ∞ | d12 = 0.347 | | | | |

TABLE 4

| | conic coefficient | aspheric coefficient | | | | | | |
|---|---|---|---|---|---|---|---|---|
| | k | A4 | A6 | A8 | A10 | A12 | A14 | A16 |
| R1 | −3.7920E−01 | 3.7502E−03 | 1.3816E−01 | −3.2976E−01 | 2.1769E−01 | 1.0296E−01 | −1.6383E−01 | −3.8774E−01 |
| R2 | −1.3227E+02 | −2.1454E−01 | 1.7240E−01 | 1.9359E+00 | −8.1034E+00 | 1.4010E+01 | −1.2664E+01 | 4.9063E+00 |
| R3 | −1.7853E+01 | −2.6680E−01 | 7.4422E−01 | 3.3259E−02 | −2.9386E+00 | 5.7423E+00 | −4.7257E+00 | 1.3132E+00 |
| R4 | 2.3039E+00 | −7.2822E−02 | 6.7527E−01 | −9.9212E−01 | 9.3052E−01 | 5.7219E−01 | −9.5441E−01 | −4.6674E−01 |
| R5 | 2.6431E+00 | −2.0098E−01 | −8.4914E−02 | 6.2687E−01 | −1.5101E+00 | 2.8626E+00 | −2.8484E+00 | 7.9348E−01 |
| R6 | −3.5260E+01 | −1.2151E−01 | −8.2844E−02 | 2.3481E−01 | −2.7658E−01 | 4.8553E−01 | −4.2207E−01 | 1.3638E−01 |
| R7 | −7.3323E+00 | 3.4603E−02 | −1.1500E−01 | 8.1238E−02 | −3.2763E−02 | 1.6902E−02 | −6.4820E−03 | 9.5592E−04 |
| R8 | −3.9071E+00 | −9.4050E−03 | 6.9364E−02 | −1.6037E−01 | 1.9135E−01 | −1.1100E−01 | 3.0298E−02 | −3.1281E−03 |
| R9 | −1.9831E+01 | −1.9668E−02 | −8.0929E−02 | 8.6204E−02 | −3.5232E−02 | 7.2131E−03 | −7.3215E−04 | 2.9095E−05 |
| R10 | −1.2344E+01 | −5.0535E−02 | −2.8356E−03 | 1.1589E−02 | −6.2040E−03 | 1.5509E−03 | −1.8675E−04 | 8.7537E−06 |

The Embodiment 2 meets the conditions (1)-(7), as shown in Table 5.

Figure 7:
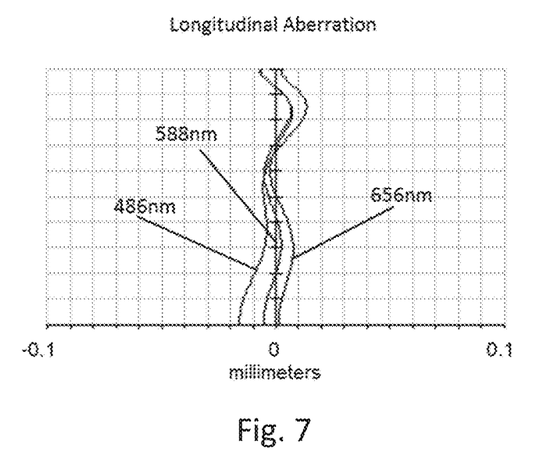
FIG. 7 is a Longitudinal Aberration diagram of the camera lens LA in the Embodiment 2.
Figure 8:
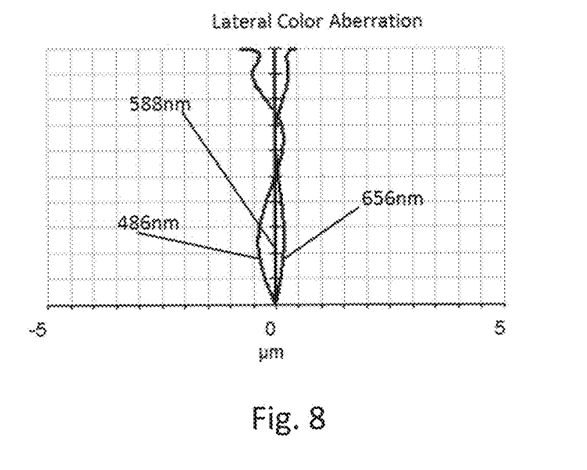
FIG. 8 is the Lateral Color Aberration diagram of the camera lens LA in the Embodiment 2.
Figure 9:
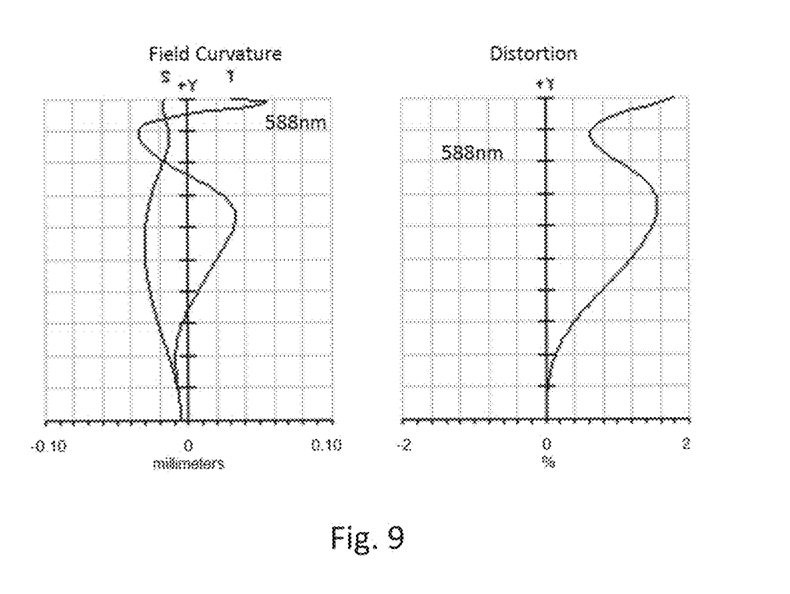
FIG. 9 is a Field Curvature Distortion of the camera lens LA in the Embodiment 2.

See FIG. 7 for Longitudinal Aberration of the camera lens LA in the Embodiment 2, see FIG. 8 for Lateral Color Aberration of it, and see FIG. 9 for curvature of field and distortion of it. As shown in FIGS. 7~9, the camera lens in embodiment 2 has 2 ω=81.2°, TTL/IH=1.337 and is also wide angle and ultra-thin, it is no wonder why chromatic aberration on axle and outside of axle is sufficiently corrected and why it has excellent optical properties.

The values in all embodiments and the values corresponding to the parameters specified in the conditions (1)-(5) are shown in the Table 7. Moreover, the units including 2ω(°), f (mm), f1 (mm), f2 (mm), f3 (mm), f4 (mm), f5 (mm), TTL (mm), LB (mm) and IH (mm) are shown in the Table 5, respectively.

TABLE 5

| | Embodiment 1 | Embodiment 2 | Condition |
|---|---|---|---|
| f1/f | 0.751 | 0.756 | (1) |
| f2/f | −1.457 | −1.473 | (2) |
| f4/f | 0.728 | 0.731 | (3) |
| (R1 + R2)/(R1 − R2) | −1.347 | −1.349 | (4) |
| (R3 + R4)/(R3 − R4) | 1.687 | 1.671 | (5) |
| d7/f | 0.175 | 0.176 | (6) |
| \|f3\|/f | 31.616 | 34.839 | (7) |
| Fno | 2.40 | 2.40 | |
| 2ω | 81.0 | 81.2 | |
| TTL/IH | 1.339 | 1.337 | |
| f | 3.366 | 3.357 | |
| f1 | 2.527 | 2.537 | |
| f2 | −4.905 | −4.946 | |

TABLE 5-continued

| | Embodiment 1 | Embodiment 2 | Condition |
|---|---|---|---|
| f3 | 106.419 | 116.954 | |
| f4 | 2.452 | 2.454 | |
| f5 | −2.165 | −2.169 | |
| TTL | 3.930 | 3.923 | |
| LB | 1.066 | 1.057 | |
| IH | 2.934 | 2.934 | |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera lens comprising, in an order from an object side to an image side:
   a first lens with positive refractive power;
   a second lens with negative refractive power;
   a third lens with negative refractive power;
   a fourth lens with positive refractive power;
   a fifth lens with negative refractive power; wherein
   the camera lens satisfies the following conditions (1)~(6):

$$0.70 \leq f1/f \leq 0.80 \qquad (1);$$

$$-2.00 \leq f2/f \leq -1.15 \qquad (2);$$

$$0.63 \leq f4/f \leq 0.80 \qquad (3);$$

$$-2.00 \leq (R1+R2)/(R1-R2) \leq -1.25 \qquad (4);$$

$$1.30 \leq (R3+R4)/(R3-R4) \leq 2.50 \qquad (5);$$

$$0.10 \leq d7/f \leq 0.19 \qquad (6);$$

where,
   f: overall focal distance of the camera lens;
   f1: focal distance of the first lens;
   f2: focal distance of the second lens;
   f4: focal distance of the fourth lens;
   R1: curvature radius of the first lens' object side surface;
   R2: curvature radius of the first lens' image side surface;
   R3: curvature radius of the second lens' object side surface R4: curvature radius of the second lens' image side surface d7: center thickness of the fourth lens.

2. The camera lens as described in claim 1 further satisfying the following condition (7):

$$10.00 \leq |f3|/f \quad (7);$$

where, f: overall focal distance of the camera lens;

f3: focal distance of the third lens.

* * * * *